Jan. 19, 1932.   V. H. PETERSON   1,842,194
VARIABLE SPEED MECHANISM FOR DRILLS
Original Filed March 19, 1928
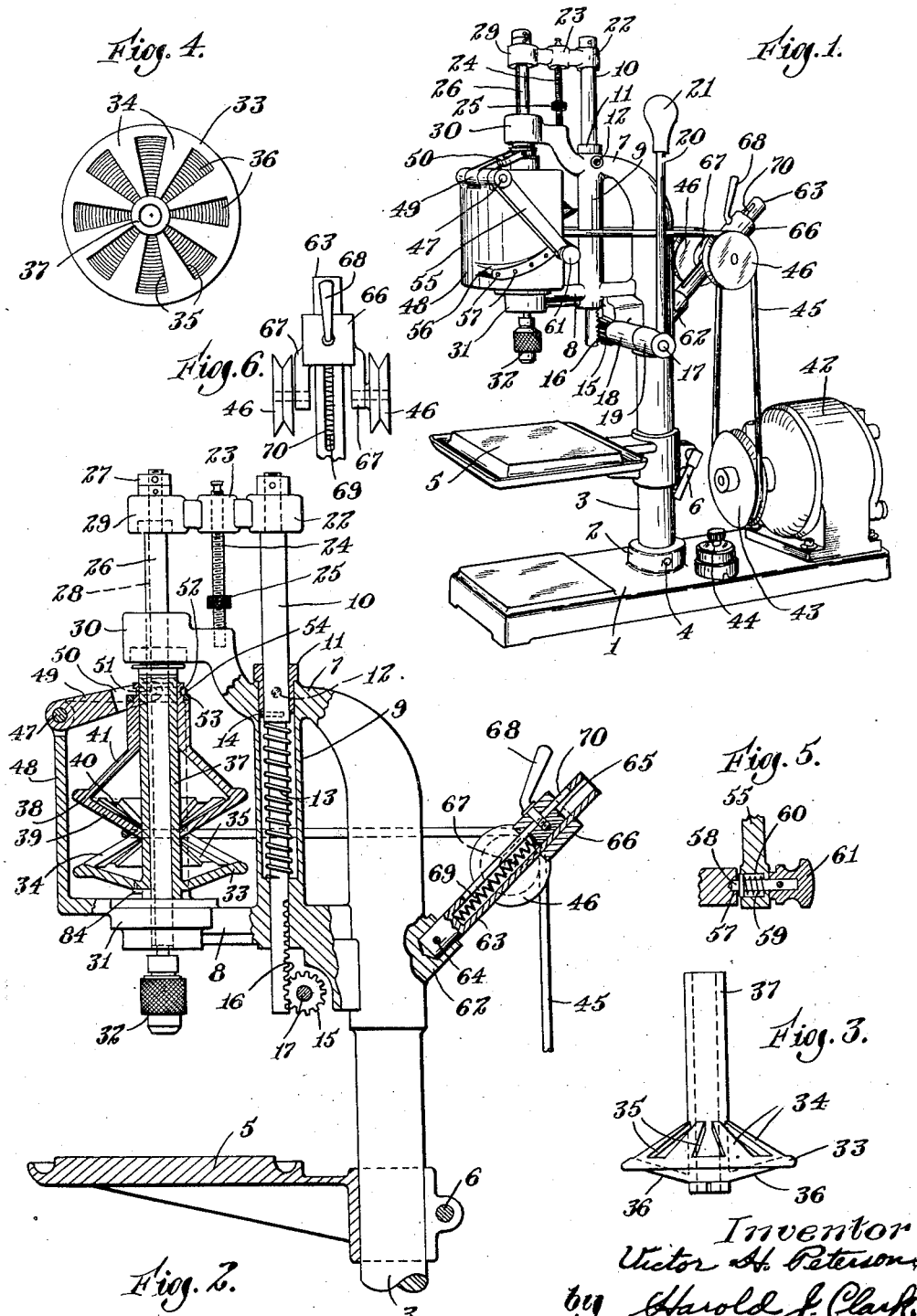

Patented Jan. 19, 1932

1,842,194

UNITED STATES PATENT OFFICE

VICTOR H. PETERSON, OF BELMONT, MASSACHUSETTS

VARIABLE SPEED MECHANISM FOR DRILLS

Continuation of application Serial No. 262,821, filed March 19, 1928. This application filed March 22, 1929.
Serial No. 349,255.

My present invention relates to drills, and more particularly to a novel and improved change speed mechanism embodied therein, although it will be appreciated and understood that I am not limited to the use of my novel change speed mechanism in a drill, but may incorporate the same in other mechanical devices where it is desirable to vary the speed of the driven element. The present application is a continuation, as to all parts in common, of my prior application Ser. No. 262,821, filed March 19, 1928.

An important object of the present invention is the provision of a bench drill, or other similar device, which will have a wide range of speeds.

Another object of the invention resides in providing a machine of this character in which the speed of the driven element, such as a drill, can be increased or decreased during continued operation of the machine.

A further object of the invention resides in the provision of spring controlled idler pulley means, automatically adjustable to compensate for the increase or decrease in circumference of the driven pulley.

Another feature of the invention resides in the provision of novel means for effecting the change of speed of the driven elements, coupled with means to retain the driven pulley members in adjusted position.

Other features of the invention reside in particular structural details by means of which I am enabled to produce an extremely sensitive, quickly adjustable machine of this character.

The above and other objects and features of the invention, details of construction, combinations of parts, and advantages, will be hereinafter more fully pointed out, described and claimed.

Referring to the drawings, illustrating a preferred embodiment of the invention, Fig. 1 is a perspective view of a bench drill embodying my invention;

Fig. 2 is a fragmentary side elevation, partly in section, of the bench drill illustrated in Fig. 1;

Fig. 3 is a side elevation of the pulley which has no vertical movement;

Fig. 4 is a top plan view of said cone;

Fig. 5 is a cross-sectional detail of the spring controlled plunger for retaining the pulley cones in adjusted position; and Fig. 6 is an elevation of the idler tensioning and clamping means.

Referring now to the drawings, for a particular description of the invention, its construction, assembly and operation, 1 designates a base having thereon an annular boss 2 within which a standard 3 is secured by a pin 4 or other suitable attaching device. Vertically adjustable on the standard or post 3 is a work-table 5, said table being also angularly adjustable, both the vertical and angular adjustments being accomplished by releasing the clamping lever 6.

The standard 3 is provided, adjacent to its upper end, with a pair of laterally extending arms 7 and 8, extending between which is a sleeve 9, preferably formed as an integral part, and vertically slidable through this sleeve is a rack bar 10.

Fitted in the upper arm 7, at the top of the sleeve, is a bushing 11 held in place by a set screw 12, and surrounding the reduced portion of the bar 10, within the sleeve, is a coiled spring 13, the bar 10 being provided with a pin 14 to engage the bottom of the bushing 11 and limit upward movement of the bar 10. Mounted adjacent to the bottom of the bar 10 is a pinion 15 which meshes with the teeth 16 of the rack bar, said pinion being mounted on a shaft 17 which has a bearing in a journal member 18 formed as an integral part of the standard 3, and to the outer end of the shaft 17 is affixed a collar 19 having a lever 20 and handle 21 for rotation of the shaft and hence of the pinion 15. This rotation of the pinion 15 will raise or lower the rack bar 10, and at the upper end of the rack bar is mounted a cross head 22. Intermediate the ends of the cross-head 22 is a journal member 23 slidable over a threaded stem 24 having adjustable nuts 25 thereon. On downward movement of the rack bar, therefore, the journal member 23 will contact with the nuts 25 and limit said downward movement.

The outer end 29 of the head 23 is provided with an internal anti-friction thrust bearing (not shown) within which rotates the spindle 26, locking collars 27 being provided therefor. This spindle is provided with a vertical keyway 28. The outer end 30 of the arm 7 is also provided with an internal anti-friction bearing (not shown) and the outer end 31 of the arm 8 is likewise provided with an internal anti-friction bearing (not shown) so that the spindle 26 will be freely rotatable. The lower end of the spindle 26 carries a drill or tool chuck 32 to receive any desirable drill or tool.

A frusto-conical pulley member 33 is provided with a key 84 adapted to spline with the key-way 28 and thus effect rotation of the spindle 26 upon rotation of the pulley cone 33. The cone 33 is provided with a plurality of radial fingers 34 defining spaces 35 therebetween. The bottom web 36 of the cone 33 is preferably solid, for strength, and the cone is provided with a vertically extending sleeve 37, this sleeve being adapted to surround the spindle 26, and to prevent vertical movement of the cone 33.

Vertically slidable over the sleeve 37 is a cone pulley member 38 provided with radial fingers 39 adapted to fit in the spaces 35 on the cone 33, and having spaces 40 in which the fingers 34 of the cone 33 will fit, thus causing a complete meshing and interlocking of the two cones 33 and 38. The web 41 of the cone 38 is formed solid for strength. It will be understood that as the cone 38 is moved toward or from the cone 33, the diameter of the annular groove formed by said cones will be respectively increased or decreased.

Mounted on the base 1 is a motor 42 driving a grooved pulley 43, current being applied to or shut off from the motor by a conveniently located switch 44. A belt 45 is driven by the pulley 43 and passes over idler pulleys 46 and thence to the juncture of the cones 33 and 38. In order to effect movement of the cone 38 toward or away from the cone 33, I provide a shaft 47 journaled adjacent to the upper edge of a semi-cylindrical shield 48 which is preferably formed as an integral part of the main casting of the machine. On this shaft is mounted a lever 48 having a yoked end 50, each of the arms of the yoke carrying a pin 51 adapted to engage an annular groove 52 in the upper end of the cone member 38.

A thrust washer 53 is provided on the cone 38 having a pin 54 to limit or prevent rotation thereof. On the outer end of the shaft 47 is affixed a handle 55, movement of which, in a clockwise direction, will effect a depression of the cone 38. In order to retain the cones 33 and 38 in their relatively adjusted position, I provide, on the exterior of the shield 48, a rib 56 provided with a plurality of recesses 57 spaced at predetermined intervals, and mounted in the lower end of the handle 55 is a plunger 58 adapted to engage a predetermined recess 57. This plunger is normally held in engagement with said recesses by means of a coiled spring 59 housed in a recess 60 in the lower end of the handle 55, the outer end of the plunger 58 being keyed or pinned to a knob 61 for manipulation of the plunger. When it is desired to adjust the relation of the pulley cones 33 and 38, the plunger 58 may be withdrawn from the recess it is occupying, and the handle 55 moved until the plunger is registered or indexed with the desired recess 57, whereupon the knob 53 will be released and the spring 59 will force the plunger into said recess and retain it therein.

On the rear of the standard 3 is provided a hollow boss 62 within which a hollow post 63 is secured by a pin 64. Within the post 64 is a slidable nut 65 and surrounding the post is a bracket 66 having a pair of depending arms 67 to each of which an idler pulley 46 is attached. The bracket 66 is provided with a small lever fitted therethrough and engaging the nut 65 for securely clamping the bracket 66 to the post 63. As the diameter of the juncture of the cones 33 and 38 is increased, the belt 45 will draw the idlers 46 toward the standard 3 against the tension of the spring 69, the clamping lever 68 having been released and sliding in the slot 70 formed in the post 63.

When the idlers have reached their adjusted position, the clamping lever 68 will be rotated to clamp the bracket 66 on the post. When the cones 33 and 38 are to be separated, the clamping lever 68 will be loosened, and as the cones separate, the spring 63 will automatically force the idlers to desired position, whereupon the clamping lever 68 will again be operated to retain said idlers in adjusted position.

By means of the mechanism above described, a wide range of speed of the spindle 26 may be accomplished without stopping the machine, the self-adjusting belt automatically adjusting itself to the changes of speed. For example, speed ranges of from 1600 to 4250 R. P. M. are accomplished in a moment, and without cessation of operation of the machine.

I believe that my machine, as above described, is novel, and I have therefore claimed the same in the present application.

The advantages, efficiency, sensitiveness, and desirability of my novel bench drill will instantly present themselves to those skilled in this art. Although illustrated herein as a bench drill, it will be appreciated that I am not limited thereto, but may apply my invention to other machines with equal facility.

While I have necessarily described my present invention somewhat in detail, it will be appreciated that I may vary the size, shape and arrangement of parts within reasonably wide limits without departing from the spirit of the invention.

The present invention is further described and defined in the form of claims as follows:

1. In a machine of the kind described, a pulley comprising a pair of relatively movable cone members, a shield in front of said cones, a shaft pivoted adjacent to the top of said shield, a lever on said shaft engaging one of said cones, and a handle mounted on said shaft, manipulation of said handle effecting a movement of the cone engaged by said lever toward or away from the other cone.

2. In a machine of the kind described, a pulley comprising a pair of relatively movable cone members, a shield in front of said cones, a shaft pivoted adjacent to the top of said shield, a lever on said shaft engaging one of said cones, a handle mounted on said shaft, manipulation of said handle effecting a movement of the cone engaged by said lever toward or away from the other cone, a rib on the exterior of said shield having a plurality of recesses arranged in an arc, and a plunger on the lower end of said handle adapted to engage said recesses to retain said cones in adjusted position.

3. In a machine of the kind described, a pulley comprising a pair of relatively movable cone members, a shield in front of said cones, a shaft pivoted adjacent to the top of said shield, a lever on said shaft engaging one of said cones, a handle mounted on said shaft, manipulation of said handle effecting a movement of the cone engaged by said lever toward or away from the other cone, a rib on the exterior of said shield having a plurality of recesses arranged in an arc, and a spring controlled plunger on the lower end of said handle adapted to engage said recesses to retain said cones in adjusted position.

4. In a machine of the kind described, a pulley comprising a pair of relatively movable cone members, a shield in front of said cones, a shaft pivoted adjacent to the top of said shield, a lever on said shaft engaging one of said cones, a handle mounted on said shaft, manipulation of said handle effecting a movement of the cone engaged by said lever toward or away from the other cone, a rib on the exterior of said shield having a plurality of recesses arranged in an arc, a spring controlled plunger on the lower end of said handle adapted to engage said recesses to retain said cones in adjusted position, a driving belt engaging said cones, and a pair of idler pulleys automatically adjustable on said relative movement of said cones.

5. In a machine of the kind described, a pulley comprising a pair of relatively movable cone members, a shield in front of said cones, a shaft pivoted adjacent to the top of said shield, a lever on said shaft engaging one of said cones, a handle mounted on said shaft, manipulation of said handle effecting a movement of the cone engaged by said lever toward or away from the other cone, said shield being provided on its outer surface with a plurality of recesses arranged in an arc, and a plunger on the outer end of said handle to engage said recesses to retain said cones in adjusted position.

In testimony whereof, I have signed my name to this specification.

VICTOR H. PETERSON.